(12) United States Patent
Maruyama et al.

(10) Patent No.: US 9,866,841 B2
(45) Date of Patent: Jan. 9, 2018

(54) IMAGE CODING METHOD AND IMAGE CODING APPARATUS

(71) Applicant: Panasonic Intellectual Property Management Co., Ltd., Osaka (JP)

(72) Inventors: Yuki Maruyama, Osaka (JP); Kiyofumi Abe, Osaka (JP); Hideyuki Ohgose, Osaka (JP); Koji Arimura, Osaka (JP); Hiroshi Arakawa, Nara (JP); Kazuma Sakakibara, Osaka (JP); Kazuhito Kimura, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 166 days.

(21) Appl. No.: 14/800,643

(22) Filed: Jul. 15, 2015

(65) Prior Publication Data

US 2016/0021374 A1 Jan. 21, 2016

(30) Foreign Application Priority Data

Jul. 15, 2014 (JP) ................. 2014-145272

(51) Int. Cl.
*H04N 19/159* (2014.01)
*H04N 19/186* (2014.01)
*H04N 19/11* (2014.01)

(52) U.S. Cl.
CPC .......... *H04N 19/159* (2014.11); *H04N 19/11* (2014.11); *H04N 19/186* (2014.11)

(58) Field of Classification Search
CPC ..... H04N 19/159; H04N 19/186; H04N 19/11
See application file for complete search history.

(56) References Cited

U.S. PATENT DOCUMENTS

| 2005/0089094 | A1 | 4/2005 | Yoo et al. |
| 2010/0040143 | A1 | 2/2010 | Kazui |
| 2010/0118960 | A1 | 5/2010 | Nonogaki |
| 2012/0128069 | A1 | 5/2012 | Sato |
| 2015/0334424 | A1* | 11/2015 | Maeda ................ H04N 19/103 375/240.02 |

FOREIGN PATENT DOCUMENTS

| JP | 2005-130509 A | 5/2005 |
| JP | 2010-045690 A | 2/2010 |
| JP | 2010-118939 A | 5/2010 |
| JP | 2011-041037 A | 2/2011 |
| JP | 2011-142699 A | 7/2011 |

* cited by examiner

*Primary Examiner* — Nam Pham
(74) *Attorney, Agent, or Firm* — Wenderoth, Lind & Ponack, L.L.P.

(57) ABSTRACT

Provided is an image coding method which obtains a picture, and codes the obtained picture. The image coding method generates a processing block, performs a first intra prediction that selects one intra prediction mode from a first set of candidates based on a component of a first signal contained in the processing block, performs a second intra prediction that selects one intra prediction mode from a second set of candidates based on a component of a second signal contained in the processing block. The first set of candidates includes a plurality of intra prediction modes, and the second set of candidates includes an intra prediction mode, having no dependency between the second intra prediction and the first intra prediction, of the plurality of intra prediction modes. The first intra prediction and the second intra prediction are performed in parallel.

6 Claims, 9 Drawing Sheets

| intra_chroma_pred_mode[xCb][yCb] | IntraPredModeY[xCb][yCb] | | | | |
|---|---|---|---|---|---|
| | 0 | 26 | 10 | 1 | X (0<=X<=34 and X≠0,1,10,26) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

FIG. 5B

| Value of intra_chroma_pred_mode | Bin string |
|---|---|
| 4 | 0 |
| 0 | 100 |
| 1 | 101 |
| 2 | 110 |
| 3 | 111 |

FIG. 6

| intra_chroma_pred_mode[xCb][yCb] | IntraPredModeY[xCb][yCb] | | | | X(0<=X<=34 and X≠0,1,10,26) |
|---|---|---|---|---|---|
| | 0 | 26 | 10 | 1 | |
| 0 | ~~34~~ 0 | 0 | 0 | 0 | 0 |
| 1 | 26 | ~~34~~ 26 | 26 | 26 | 26 |
| 2 | 10 | 10 | ~~34~~ 10 | 10 | 10 |
| 3 | 1 | 1 | 1 | ~~34~~ 1 | 1 |
| 4 | 0 | 26 | 10 | 1 | ~~34~~ X |

FIG. 7

| intra_chroma_pred_mode[xCb][yCb] | IntraPredModeY[xCb][yCb] | | | | |
|---|---|---|---|---|---|
| | 0 | 26 | 10 | 1 | X(0<=X<=34 and X≠0,1,10,26) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | ≠ |

IMAGE CODING METHOD AND IMAGE CODING APPARATUS

RELATED APPLICATIONS

This application claims the benefit of Japanese Patent Application No. 2014-145272 filed on Jul. 15, 2014, the disclosure of which application is incorporated by reference herein.

BACKGROUND

1. Technical Field

The present disclosure relates to an image coding method and an image coding apparatus for performing intra prediction.

2. Description of the Related Art

One known video coding standard is an MPEG-4 AVC/H.264 (hereinafter referred to as H.264) standard. Such video coding standard performs intra prediction that selects one prediction mode from a plurality of intra prediction modes (see, e.g., Unexamined Japanese Patent Publication Nos. 2005-130509, 2011-41037, and 2011-142699).

A High Efficiency Video Coding (HEVC) standard is now under development as a next-generation video coding standard that comes after H.264.

SUMMARY

An image coding method according to the present disclosure is an image coding method for obtaining a picture in a video sequence and coding the obtained picture, the picture containing a first signal and a second signal. The image coding method includes partitioning the obtained picture, to generate at least one processing block as a processing unit for intra prediction, performing, on each of the at least one processing block, a first intra prediction that selects one intra prediction mode from a first set of candidates based on a component of the first signal contained in the processing block, performing, on each of the at least one processing block, a second intra prediction that selects one intra prediction mode from a second set of candidates based on a component of the second signal contained in the processing block, and performing a first coding process that predictively codes the component of the first signal contained in each of the at least one processing block by using the intra prediction mode selected in the first intra prediction, and performing a second coding process that predictively codes the component of the second signal contained in each of the at least one processing block by using the intra prediction mode selected in the second intra prediction. The first set of candidates includes a plurality of intra prediction modes. The second set of candidates includes at least one intra prediction mode, having no dependency between the second intra prediction and the first intra prediction, of the plurality of intra prediction modes, and the first intra prediction and the second intra prediction are performed in parallel.

DETAILED DESCRIPTION

The HEVC standard incorporates various improvements for achieving higher efficiency (higher compression ratio) than that of the H.264 standard. For example, while the intra prediction of H.264 selects one prediction mode from nine prediction modes, the intra prediction of the HEVC standard selects one prediction mode from 35 prediction modes. Such an improvement indeed permits the HEVC standard to achieve higher efficiency. However, an increase in amount of image coding operation imposes a processing load that is very heavy. Despite such a heavy processing load in image coding processing of the HEVC standard, higher performance is demanded in image coding processing, in particular, to ensure real-time characteristics.

Thus, the present disclosure provides an image coding method and an image coding apparatus capable of achieving higher performance, among others, in image coding in intra prediction, while performing the image coding that meets the HEVC standard.

An exemplary embodiment will be described below in detail with reference to the drawings as appropriate. Note that a more detailed description than is necessary may be omitted. For example, a well-known subject may not be described in detail, and/or a substantially same configuration may not be described redundantly. This is to avoid unnecessary redundancy in the following description, and to facilitate understanding by those skilled in the art.

It is understood that the inventors of the present invention provide the accompanying drawings and the following description so that those skilled in the art will fully understand the present disclosure, and do not intend to limit the claimed subject matter.

The exemplary embodiment will be described below with reference to FIGS. 1 to 8B. For purposes of illustration, an operation during coding according to the HEVC standard will be described.

[Configuration of Image Coding Apparatus]

Figure 1:
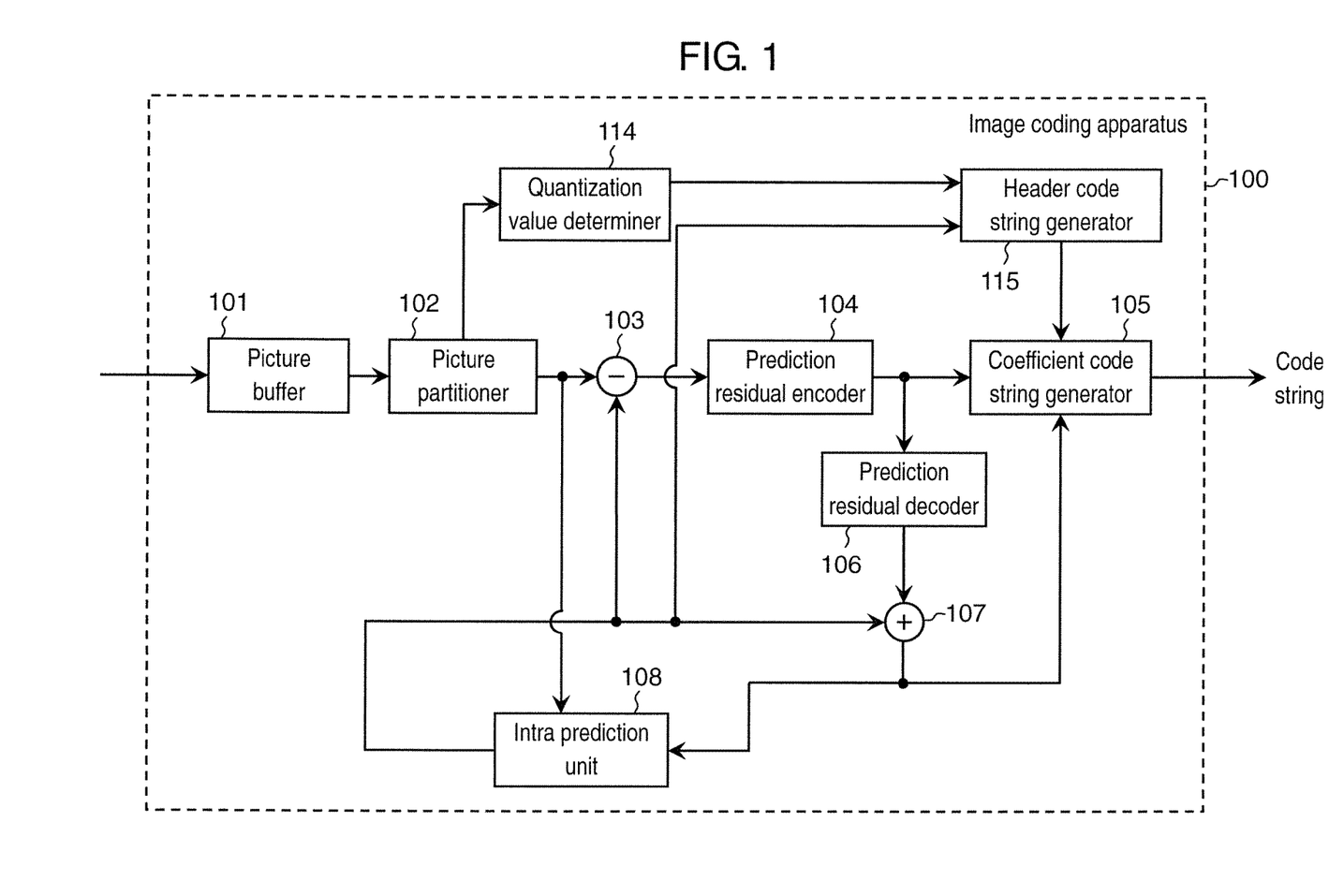
FIG. 1 is a block diagram illustrating an example configuration of an image coding apparatus according to an exemplary embodiment.

FIG. 1 is a block diagram illustrating an example configuration of image coding apparatus 100 according to this exemplary embodiment.

Image coding apparatus 100 partitions a video frame that is input on a picture-by-picture basis into coding units (CUs), and performs coding on a CU-by-CU basis, to thereby generate code strings. Note that a CU includes a plurality of sub-blocks. Components included in image coding apparatus 100 perform processes on a CU-by-CU basis or on a sub-block-by-sub-block basis.

Image coding apparatus 100 shown in FIG. 1 includes picture buffer 101, picture partitioner 102, subtractor 103, prediction residual encoder 104, coefficient code string generator 105, prediction residual decoder 106, adder 107, intra prediction unit 108, quantization value determiner 114, and header code string generator 115.

Image coding apparatus 100 performs compression coding on an input image according to the HEVC standard, and generates and outputs a code string.

Picture buffer 101 obtains the input image, and temporarily stores the input image in a storage medium. For example, picture buffer 101 sorts input images, which are input on a picture-by-picture basis in display order, into coding order, and then stores the input images. Any device may be used as the storage medium in picture buffer 101 as long as the device can store the input images, including a dynamic random access memory (DRAM).

Picture partitioner 102 partitions a picture to be coded into a plurality of coding units (CUs), and each of the plurality of partitioned coding units is then further partitioned into a plurality of processing blocks (prediction units: PUs), which are processing units for intra prediction. Upon receiving a read instruction from subtractor 103 or from quantization value determiner 114, picture partitioner 102 obtains an input image from picture buffer 101. Picture partitioner 102 then outputs an image signal associated with the read instruction, to subtractor 103.

Note that the block sizes of a CU and a PU may be set any time before the use and processing of the CU and the PU. The block size of a PU may be set after the block size of a CU is set. Alternatively, the block size of a CU may be set after the block size of a PU is set. Moreover, the block sizes of a CU and a PU may be set substantially simultaneously.

CU is one example of a coding unit, and is a block of, for example, 64×64 pixels, 32×32 pixels, 16×16 pixels, or 8×8 pixels.

Subtractor 103 calculates a difference between at least one CU to be processed (hereinafter referred to as "target CU") that is output from picture partitioner 102, and a predicted image that is output from intra prediction unit 108, to thereby generate a residual signal. For example, subtractor 103 calculates a difference on a CU-by-CU basis or on a sub-block-by-sub-block basis. Subtractor 103 outputs the residual signal to prediction residual encoder 104.

Prediction residual encoder 104 performs orthogonal transformation on the residual signal that is output from subtractor 103 to generate an orthogonal transformation coefficient. If orthogonal transformation is performed on the residual signal, prediction residual encoder 104 performs orthogonal transformation on the residual signal on a sub-block-by-sub-block basis, which sub-blocks are those for use in orthogonal transformation. Here, a sub-block for use in orthogonal transformation is an orthogonal transformation processing unit containing a plurality of pixels, and is referred to as a transform unit (TU). For example, a sub-block for use in orthogonal transformation (TU) is a block of 32×32 pixels, 16×16 pixels, 8×8 pixels, or 4×4 pixels. The block size applicable to a TU varies depending on whether the input signal is a luminance component or a chrominance (color difference) component.

Further, prediction residual encoder 104 quantizes each of the frequency components of the obtained orthogonal transformation coefficient, and thus generates a quantized coefficient. Prediction residual encoder 104 then outputs the quantized coefficient to coefficient code string generator 105 and to prediction residual decoder 106. Note that prediction residual encoder 104 quantizes the orthogonal transformation coefficient using the quantization value determined by quantization value determiner 114.

Coefficient code string generator 105 codes the quantized coefficient that is output from prediction residual encoder 104, using variable length coding. Coefficient code string generator 105 adds a code string generated using the variable length coding to a code string generated by header code string generator 115. Coefficient code string generator 105 thus generates a code string signal for output.

Prediction residual decoder 106 performs dequantization and inverse orthogonal transformation on the quantized coefficient that is output from prediction residual encoder 104 to reconstruct a residual decode signal. Prediction residual decoder 106 outputs the obtained residual decode signal, to adder 107.

Adder 107 adds together the residual decode signal that is output from prediction residual decoder 106 and the predicted image that is output from intra prediction unit 108, to thereby generate a reconstruction image signal. Adder 107 then outputs the reconstruction image signal to intra prediction unit 108.

Intra prediction unit 108 generates a predicted image for the block that is output from picture partitioner 102 based on at least the reconstruction image signal that is output from adder 107. Intra prediction unit 108 uses intra prediction to generate a predicted image.

Note that intra prediction unit 108 generates a predicted image on a sub-block-by-sub-block basis, which sub-blocks are those for use in prediction. Here, a sub-block for use in prediction is a prediction processing unit containing a plurality of pixels, and is referred to as a prediction unit (PU). A sub-block for use in prediction (PU) is, for example, a region or each of regions generated by partitioning the coding unit, which is output from picture partitioner 102, into at least one region. For example, a PU is a block of 64×64 pixels, 32×32 pixels, 16×16 pixels, 8×8 pixels, or 4×4 pixels. In this regard, the PU size is determined based on the CU size. More specifically, the PU size is the same as the CU size, or the length of one side is half that of a CU.

Intra prediction unit 108 generates, on a PU-by-PU basis, a predicted image for the target CU using pixel data around the target CU, the pixel data being included in a coded CU. More specifically, intra prediction unit 108 generates a predicted image by performing intra prediction based on coded pixel data adjacent to the target CU.

Intra prediction unit 108 selects one intra prediction mode from the 35 intra prediction modes defined in HEVC, which is the coding standard assumed for image coding apparatus 100. In addition, intra prediction unit 108 generates a predicted image of a target PU to be processed, by performing intra prediction based on the selected intra prediction mode. Intra prediction unit 108 outputs a predicted image associated with the block that is output by picture partitioner 102 to subtractor 103 and to adder 107 on a TU-by-TU basis.

A more detailed operation of intra prediction unit 108 will be described later herein.

Quantization value determiner 114 sets a quantization value (quantization width) for quantizing the residual signal in prediction residual encoder 104 based on the picture stored in picture partitioner 102. Quantization value determiner 114 outputs the set quantization value to prediction residual encoder 104 and to header code string generator 115. Note that quantization value determiner 114 may use, as the method for setting a quantization value, a method for setting a quantization value based on rate control, in which a quantization value is set so that a bit rate of the code string signal approximates to a desired bit rate.

Header code string generator 115 codes the prediction information output by intra prediction unit 108, the quantization value output by quantization value determiner 114, and control information about other coding control, using variable length coding, to thereby generate code strings. Note that the prediction information includes information that indicates, for example, the intra prediction mode, the inter prediction mode, the motion vector, and the reference picture. The control information is information that is obtainable before the process performed in coefficient code string generator 105, and is information that indicates coding conditions applied during block coding. The control information includes, for example, a picture coding type or block partitioning information. A picture coding type is, for example, information indicating whether the picture is I-picture, P-picture, or B-picture, or information about the prediction method applied to the blocks. Block partitioning information includes, for example, sub-block partitioning information for the orthogonal transformation, or sub-block partitioning information associated with intra prediction unit 108.

[Image Coding Process]

A flow of an image coding process performed by image coding apparatus 100 will next be described.

Figure 2:
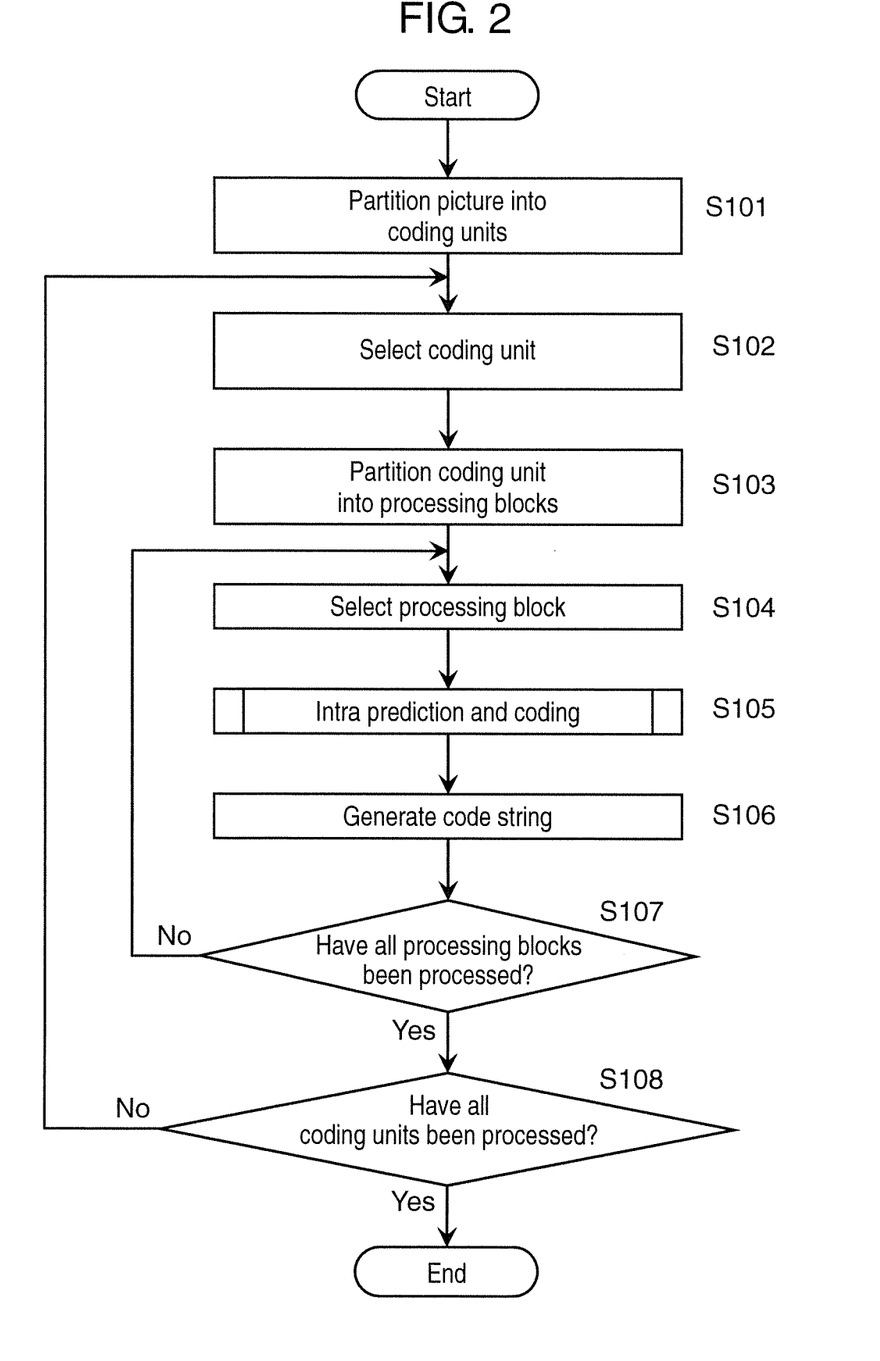
FIG. 2 is a flowchart illustrating an example of an image coding process according to the exemplary embodiment.

FIG. 2 is a flowchart illustrating an example of an image coding process performed by image coding apparatus 100.

As shown in FIG. 2, picture partitioner 102 partitions a picture to be processed into a plurality of coding units (CUs) (step S101). Next, picture partitioner 102 selects a target CU to be processed from the plurality of CUs, and sends the target CU to subtractor 103 (step S102).

Picture partitioner 102 further partitions the target CU into a plurality of processing blocks (PUs) (step S103). Next, picture partitioner 102 selects a target PU to be processed, and sends the target PU to intra prediction unit 108 (step S104).

Then, intra prediction unit 108 performs an intra prediction process and a coding process on the PU to be processed according to a predetermined procedure (step S105). Thus, a predicted image associated with the PU to be processed is generated. In addition, a quantized coefficient and a reconstruction image signal associated with the PU to be processed are generated. Details of intra prediction unit 108 will be described later herein.

Next, header code string generator 115 codes information about the intra prediction process using variable length coding. Coefficient code string generator 105 codes the quantized coefficient using variable length coding to generate a code string (step S106).

Thus, the intra prediction process for one PU is complete. Image coding apparatus 100 repeats this series of processes for all the PUs (step S107). The coding process for one CU is thus complete. Moreover, image coding apparatus 100 repeats this series of coding process for all the CUs (step S108).

[Intra Prediction Process]

The intra prediction process (step S105 of FIG. 2) performed by intra prediction unit 108 will next be described in detail.

Figure 3:
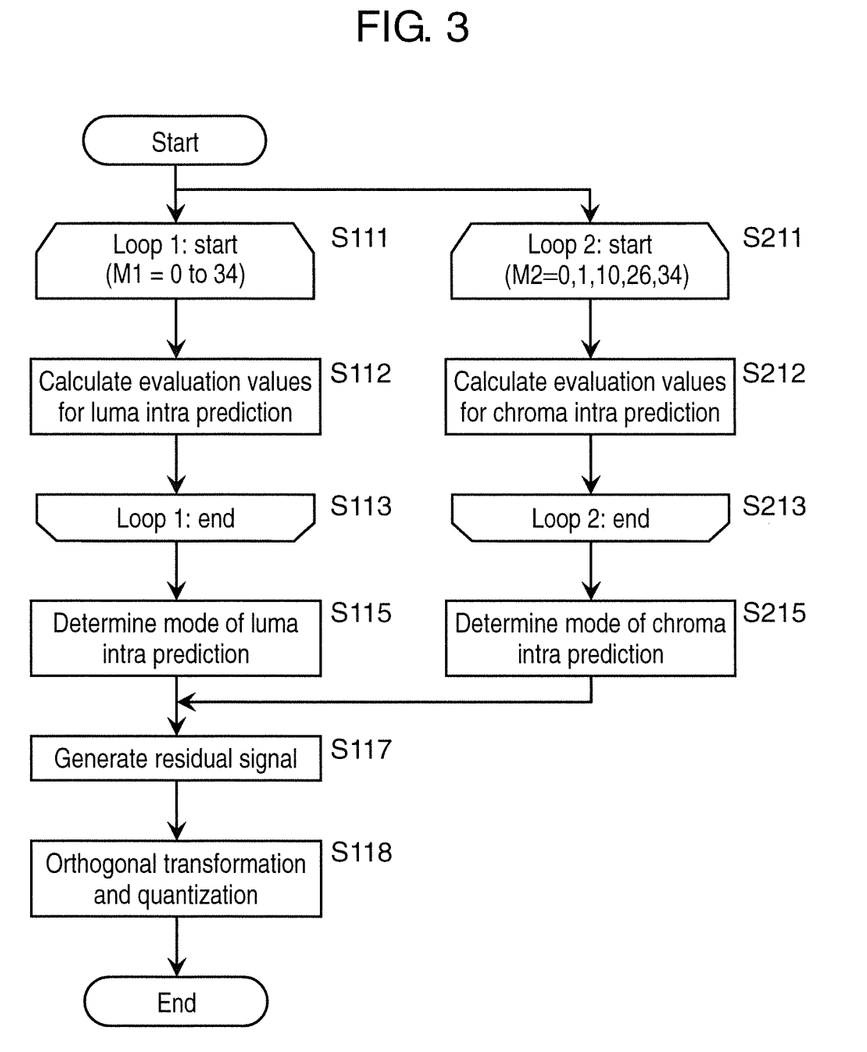
FIG. 3 is a flowchart illustrating a detailed example of an intra prediction process according to the exemplary embodiment.
Figure 4:
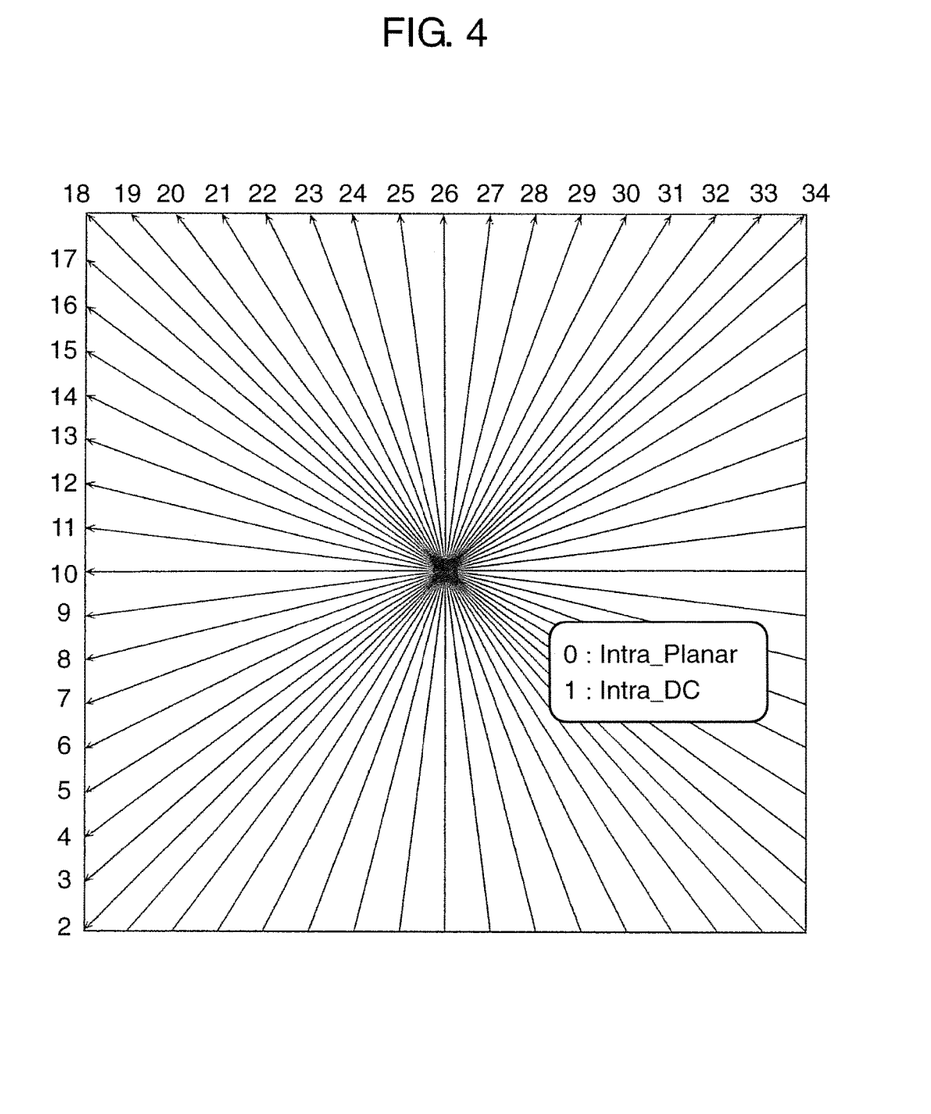
FIG. 4 is a diagram illustrating 35 intra prediction modes (modes 0 to 34) according to the exemplary embodiment.

FIG. 3 is a flowchart illustrating a detailed example of the intra prediction process (step S105 of FIG. 2) performed by intra prediction unit 108. FIG. 4 is a diagram illustrating the 35 intra prediction modes (modes 0 to 34) defined in the HEVC standard. These intra prediction modes are defined in the HEVC standard. As shown in FIG. 4, the HEVC standard defines a planar prediction mode (mode 0), a DC prediction mode (mode 1), and 33 angular prediction modes (modes 2 to 34).

Intra prediction unit 108 selects a suitable prediction mode from the 35 candidate prediction modes (i.e., modes 0 to 34) shown in FIG. 4, and then performs the coding. If the picture to be coded contains a plurality of signal components, such as, for example, a luminance signal and a chrominance signal, the HEVC standard permits different prediction modes to be selected for the respective signal components. For purposes of illustration, it is assumed herein that the picture to be coded has a luminance signal and a chrominance signal.

First, an outline of the intra prediction process shown in FIG. 3 will be described.

Intra prediction unit 108 performs first intra prediction on the luminance signal (step S115 in loop 1), second intra prediction on the chrominance signal (step S215 in loop 2), and predictive coding using the results of the first intra prediction and the second intra prediction (steps S117 and S118).

The first intra prediction (step S115 in loop 1) is a process to select, for each of the processing blocks partitioned in step S103 of FIG. 2, one intra prediction mode from a first set of candidates including a plurality of intra prediction modes based on the component of a first signal contained in the processing block. Here, the first signal is, for example, a luminance signal that represents luminance. The first set of candidates is the set of 35 intra prediction modes shown in FIG. 4. The values of a control variable M1 of loop 1 correspond to the 35 intra prediction modes (modes 0 to 34) in the first set of candidates.

The second intra prediction (step S215 in loop 2) is a process to select, for each of the processing blocks described above, one intra prediction mode from a second set of candidates, which is a subset of the plurality of intra prediction modes, based on the component of a second signal contained in the processing block. Here, the second signal is, for example, a chrominance signal that represents chrominance. The second set of candidates is a subset including the intra prediction modes other than the intra prediction modes having dependency between the second intra prediction and the first intra prediction, of the first set of candidates. The term "dependency" as used herein will be discussed below in more detail. The values of a control variable M2 of loop 2 correspond to the intra prediction modes in the second set of candidates (i.e., modes 0, 1, 10, 26, and 34). Note that the control variable M2 may exclude the number 34.

The predictive coding (steps S117 and S118) refers to a process to predictively code (i.e., to generate, orthogonally transform, and quantize the residual signals of) the components of the first and second signals contained in a processing block using the prediction modes selected in the first intra prediction and the second intra prediction. The predictive coding (i.e., generation, orthogonal transformation, and quantization of the residual signal) of the component of the first signal contained in a processing block by using the intra prediction mode selected in the first intra prediction is referred to as first coding. The predictive coding (i.e., generation, orthogonal transformation, and quantization of the residual signal) of the component of the second signal contained in a processing block by using the intra prediction mode selected in the second intra prediction is referred to as second coding. The predictive coding (steps S117 and S118) includes the first coding and the second coding.

Details of the intra prediction process shown in FIG. 3 will next be described.

In the first intra prediction (loop 1 and step S115), intra prediction unit 108 first calculates evaluation values for the 35 candidate intra prediction modes in the first set of candidates with respect to the luminance signal (loop 1: steps S111 to S113). An evaluation value is, for example, the sum of absolute values of residual signals of luminance. Next, intra prediction unit 108 compares the calculated evaluation values, and determines, or selects, the most suitable prediction mode (step S115). If the sum of absolute values of residual signals of luminance is used for each evaluation value, the prediction mode having the lowest evaluation value is often selected as the most suitable prediction mode.

In the second intra prediction (loop 2 and step S215), intra prediction unit 108 first calculates evaluation values for the candidate intra prediction modes in the second set of candidates with respect to the chrominance signal (loop 2: steps S211 to S213). An evaluation value is, for example, the sum of absolute values of residual signals of chrominance. Next, intra prediction unit 108 compares the calculated evaluation values, and determines, or selects, the most suitable prediction mode (step S215).

After step S115 and step S215, subtractor 103 generates a residual signal, which represents the difference between a target PU and the predicted image (step S117). Next, prediction residual encoder 104 performs orthogonal transformation and quantization on the residual signal to generate a quantized coefficient (step S118). Prediction residual decoder 106 performs dequantization and inverse orthogonal transformation on the quantized coefficient to generate a residual decode signal. Next, adder 107 adds together the residual decode signal and the predicted image to generate a reconstruction image signal. The reconstruction image signal is used in intra prediction processes of subsequent PUs.

The intra prediction process for one PU is thus completed.

Before description of the second set of candidates, chroma intra prediction defined in the HEVC standard will be described.

Figure 5A:
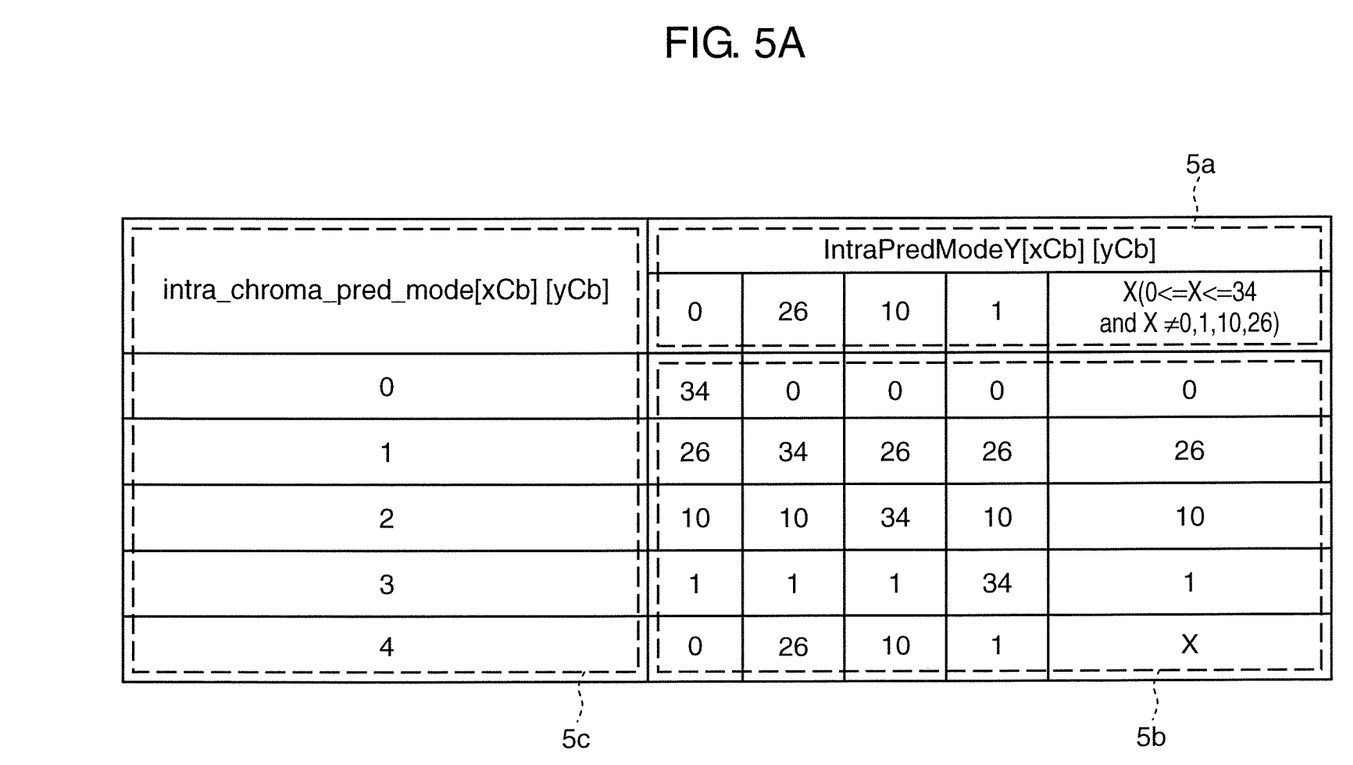
FIG. 5A is a table for illustrating chroma intra prediction defined in the HEVC standard.

FIG. 5A is a table for illustrating chroma intra prediction defined in the HEVC standard. The table of FIG. 5A has small tables 5a, 5b, and 5c. The procedure of intra prediction that follows this table needs to be sequentially performed in the order of, for example, luma intra prediction, reference to small tables 5a and 5b, chroma intra prediction, reference to small table 5c, and coding (generation, orthogonal transformation, and quantization of a residual signal). This is due to dependency between small tables 5a and 5b.

Small table 5a shows intra prediction modes selectable for intra prediction for the luminance signal (i.e., luma intra prediction). In other words, selectable intra prediction modes are the 35 intra prediction modes in the first set of candidates. Small table 5a shows the 35 intra prediction modes in five groups: modes 0, 26, 10, and 1, and the other intra prediction modes. The four intra prediction modes of modes 0, 26, 10, and 1 are significantly more likely to be selected than the other intra prediction modes, and the prediction mode (mode X) of the fifth group in small table 5a is less likely to be selected than the above-mentioned four intra prediction modes, where X represents an integer between 0 and 34 (inclusive), excluding 0, 1, 10, and 26 (that is, X represents one of 2 to 9, 11 to 25, and 27 to 34). Small table 5a is partitioned into five parts to show the relationship between the values in small table 5a and small table 5b.

Each row of small table 5b shows the candidates selectable for chroma intra prediction respectively corresponding to the five groups of the luma intra prediction.

Small table 5c shows the codes that respectively correspond to the row-wise groups of the candidate intra prediction modes selectable for chroma intra prediction.

For example, if mode 0 has been selected in small table 5a in the luma intra prediction (IntraPredModeY of FIG. 5A), the chroma intra prediction mode can be selected from mode 34, mode 26, mode 10, mode 1, and mode 0 in small table 5b. In this case, the code for the chroma intra prediction mode (intra_chroma_pred_mode of FIG. 5A) will be, as shown in small table 5c, 0 when the chroma intra prediction mode is mode 34; 1 when mode 26; 2 when mode 10; 3 when mode 1; and 4 when mode 0.

Meanwhile, if mode 26, mode 10, or mode 1 has been selected in the luma intra prediction, the code is similarly generated according to the values in the table of FIG. 5A. On the contrary, if a mode other than modes 0, 26, 10, and 1 has been selected (mode X of FIG. 5A has been selected) in the luma intra prediction, the code for the chroma intra prediction mode will be 0 when the chroma intra prediction mode is mode 0; 1 when mode 26; 2 when mode 10; 3 when mode 1; and 4 when the chroma intra prediction mode is the same prediction mode as the luma intra prediction mode. Each code in small table 5c is further converted to a bit string.

Figure 5B:
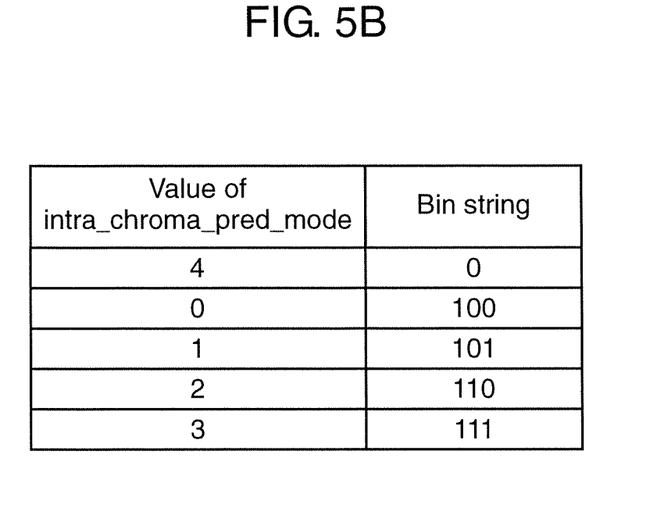
FIG. 5B is a chart illustrating bit strings corresponding to codes in chroma intra prediction according to the exemplary embodiment.

FIG. 5B is a chart illustrating bit strings respectively corresponding to the codes in the chroma intra prediction. The column "Value of intra_chroma_pred_mode" of FIG. 5B shows the values of the codes in small table 5c, and the column "Bin string" shows the bit strings (bit patterns) respectively corresponding to the codes.

Dependency between the luma intra prediction and the chroma intra prediction in FIG. 5A will next be described.

As described above, the HEVC standard associates small table 5a with small table 5b of FIG. 5A. This association makes a part of the candidate intra prediction modes selectable in chroma intra prediction dependent on the intra prediction mode selected in the luma intra prediction.

In other words, mode X in small table 5b (where X is one of 2 to 9, 11 to 25, and 27 to 34) has dependency such that the value of X is determined only after mode X is selected in the luma intra prediction. In this manner, the 31 modes that fall into mode X among the 35 intra prediction modes have dependency between the luma intra prediction and the chroma intra prediction. In contrast, the intra prediction modes other than mode X (i.e., modes 0, 1, 10, and 26) have no such dependency.

Mode 34 in small table 5b has another type of dependency such that if mode X has been selected in the luma intra prediction and mode X is not mode 34, then mode 34 is not allowed to be selected for chroma intra prediction. Mode 34 is also one of the candidate chroma intra prediction modes when mode 0, 1, 10, or 26 has been selected in the luma intra prediction. In this regard, the dependency of mode 34 can be considered as being weaker than the dependency of mode X other than mode 34. In other words, among the 31 modes that fall into mode X having dependency, the 30 modes that fall into mode X other than mode 34 can be considered as having stronger dependency than mode 34. That is, mode 34 does not have so strong dependency as that of the 30 modes that fall into mode X other than mode 34.

As described above, of the 35 intra prediction modes shown in FIG. 5A, the 30 intra prediction modes (mode X other than mode 34) can be considered as having strong dependency between the luma intra prediction and the chroma intra prediction, while one intra prediction mode (mode 34) can be considered as having weaker dependency between the luma intra prediction and the chroma intra prediction than mode X other than mode 34. That is, if the luma intra prediction has selected mode 34, then mode 34 is a candidate in the chroma intra prediction. In addition, if the luma intra prediction has selected one of modes 0, 1, 10, and 26, mode 34 is also a candidate in the chroma intra prediction. In contrast, if the luma intra prediction has selected mode X other than mode 34, then mode 34 is not a candidate in the chroma intra prediction. In this manner, even though the selectability of mode 34 in the chroma intra prediction depends on which mode the luma intra prediction has selected, this dependency can be considered as weaker than that of mode X other than mode 34. Note that modes 0, 1, 10, and 26 have no dependency.

In this exemplary embodiment, with attention to such dependency, the chroma intra prediction uses a set of intra prediction modes other than the intra prediction modes that have dependency (i.e., a set of intra prediction modes having no dependency) as the candidate intra prediction modes that are selectable (referred to as "second set of candidates") as in the loop 2 procedure of FIG. 3. This eliminates the need for the chroma intra prediction to be sequentially performed after the luma intra prediction. That is, the luma intra prediction and the chroma intra prediction can be performed in parallel as in loop 1 and loop 2 of FIG. 3, thereby permitting higher performance to be achieved. Moreover, the chroma intra prediction of this exemplary embodiment remains within the scope of, and thus does not depart from, the HEVC standard.

Next, the second set of candidates in the chroma intra prediction of this exemplary embodiment will be described.

Figure 6:
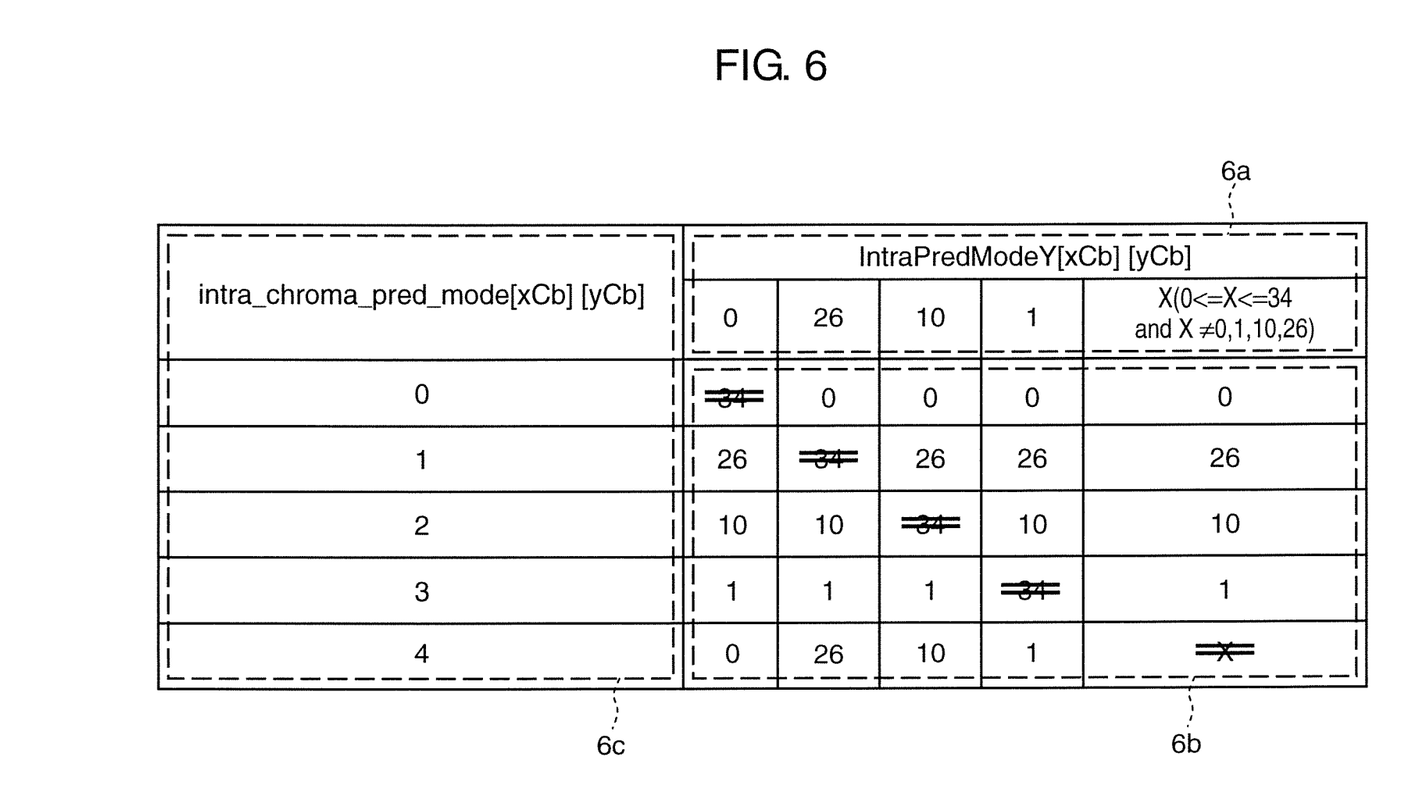
FIG. 6 is a table for illustrating an intra prediction process according to the exemplary embodiment.

FIG. 6 is a table for illustrating an intra prediction process according to this exemplary embodiment. The table of FIG. 6 has small tables 6*a*, 6*b*, and 6*c*. The procedure of intra prediction that follows this table permits the luma intra prediction and the chroma intra prediction to be performed in parallel, after which reference to small tables 5*a* to 5*c*, and coding (herein, generation, orthogonal transformation, and quantization of the residual signal) are performed.

Small tables 6*a* and 6*c* of FIG. 6 are respectively the same as small tables 5*a* and 5*c* shown in FIG. 5A. Small table 6*b* differs from small table 5*b* in that the intra prediction modes indicated by the use of double strikethrough are excluded from the second set of candidates. In the following description, the focus will be on the differences.

In small table 6*b*, the 31 intra prediction modes of mode X have been removed compared with those of small table 5*b*. More specifically, mode 34 is removed in each of the columns in small table 6*b* that respectively correspond to four groups (modes 0, 26, 10, and 1) of small table 6*a*, and in addition, mode X is removed in the column of small table 6*b* that corresponds to the fifth group (mode X) of small table 6*a*. In this manner, the second set of candidates shown in small table 6*b* is a subset including the intra prediction modes other than the intra prediction modes having dependency between the chroma intra prediction and the luma intra prediction. That is, the second set of candidates shown in small table 6*b* includes the intra prediction modes that have remained after removal of the intra prediction modes having dependency from the first set of candidates (i.e., the 35 intra prediction modes) without distinction between strong dependency and weak dependency.

As described above, the intra prediction modes having dependency between the luma intra prediction and the chroma intra prediction have been removed in the second set of candidates in small table 6*b* of FIG. 6. Thus, intra prediction unit 108 can perform the luma intra prediction and the chroma intra prediction in parallel, thereby permitting higher performance to be achieved.

Next, a variation of the second set of candidates for the chroma intra prediction according to this exemplary embodiment will be described.

Figure 7:
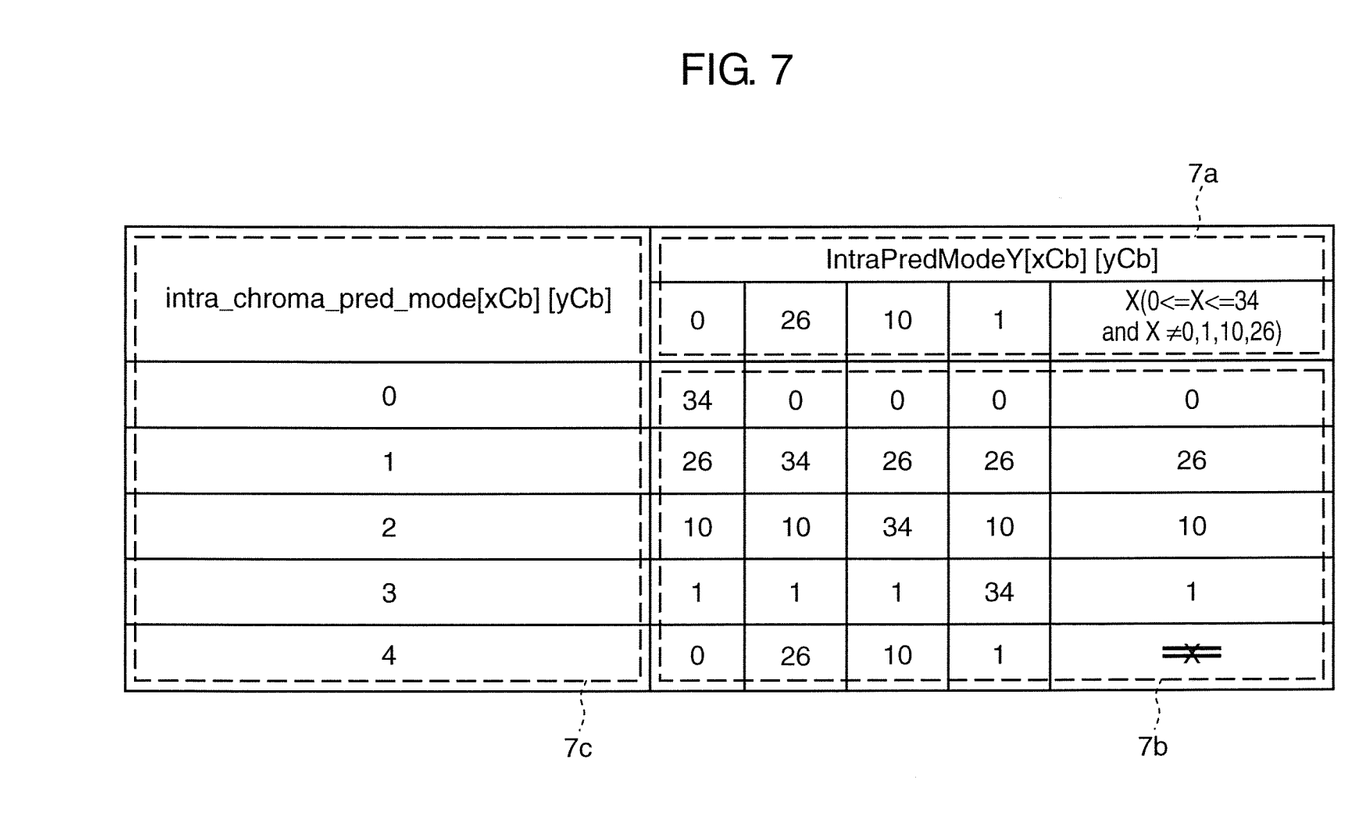
FIG. 7 is another table for illustrating a variation of the intra prediction process according to the exemplary embodiment.

FIG. 7 is another table for illustrating a variation of the intra prediction process according to this exemplary embodiment. Small tables 7*a* and 7*c* of FIG. 7 are respectively the same as small tables 6*a* and 6*c* of FIG. 6. Small table 7*b* of FIG. 7 differs from small table 6*b* of FIG. 6 in that mode 34 has not been removed in each of the four left groups of the five groups. In the following description, the focus will be on the differences.

As has already been described, mode 34 is considered as not having so strong dependency as that of mode X other than mode 34. The second set of candidates shown in small table 7*b* is a subset including the intra prediction modes other than the intra prediction modes that have strong dependency between the chroma intra prediction and the luma intra prediction. That is, the second set of candidates of small table 7*b* includes the intra prediction modes that have remained after removal of the intra prediction modes having strong dependency from the first set of candidates (i.e., the 35 intra prediction modes).

To comply with the HEVC standard in the chroma intra prediction that follows the another table shown in FIG. 7, the following post processing needs to be performed after completion of steps S115 and S215 of FIG. 3. That is, if the luma intra prediction has selected mode X, then intra prediction unit 108 is supposed to perform post processing that avoids mode 34 in the chroma intra prediction. For example, firstly, as the post processing, if the chroma intra prediction has selected mode 34, then intra prediction unit 108 determines whether the luma intra prediction has selected any one of four modes 0, 1, 10, and 26. Next, if intra prediction unit 108 determines that the luma intra prediction has selected one of the four modes mentioned above, the process proceeds to step S117 as it is. In contrast, if intra prediction unit 108 determines that the luma intra prediction has selected none of the four modes mentioned above (the luma intra prediction has selected mode X), then the selection result of the chroma intra prediction may be changed to an intra prediction mode other than mode 34 (for example, an intra prediction mode having a second suitable evaluation value is selected) before the process proceeds to step S117.

As described above, even though this variation of the intra prediction that follows the another table shown in FIG. 7 requires post processing to comply with the HEVC standard, capability of performing loop 1 and loop 2 of FIG. 3 in parallel can achieve higher performance.

[Advantageous Effects of the Present Disclosure]

As described above, image coding apparatus 100 performs intra prediction that selects one of the 35 intra prediction modes shown in FIG. 4. As shown in FIG. 5A, the HEVC standard has intra prediction modes that have dependency such that the chroma intra prediction mode is determined depending on the result of the intra prediction process, of the luminance signal, that is not defined in H.264. Thus, coding efficiency can be improved by completing the intra prediction process of the luminance signal of a target PU before starting the intra prediction process of the chrominance signal of the target PU.

However, for processing using an intra prediction mode that has dependency such that the chroma intra prediction mode is determined depending on the result of the intra prediction process of the luminance signal shown in FIG.

Figure 8A:
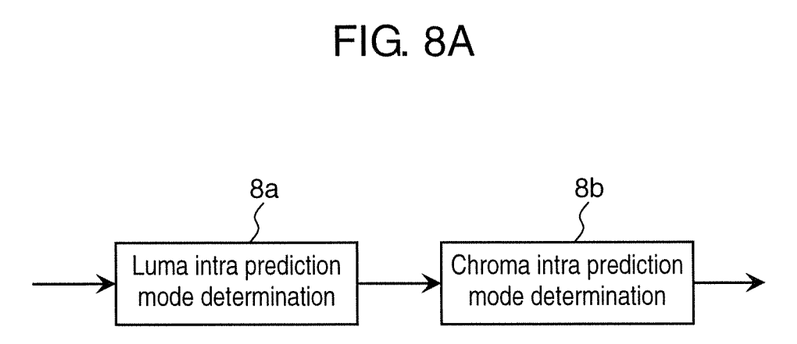
FIG. 8A is a diagram for illustrating an intra prediction process according to the HEVC standard.

5A, the intra prediction process of the luminance signal and the intra prediction process of the chrominance signal need to be sequentially performed as shown in FIG. 8A. Note that luma intra prediction mode determination 8a in FIG. 8A corresponds to the luma intra prediction of loop 1 and step S115 of FIG. 3, and chroma intra prediction mode determination 8b corresponds to the chroma intra prediction of loop 2 and step S215 of FIG. 3 plus calculation of evaluation values for mode X. Since mode X of FIG. 5A has dependency between the luma intra prediction and the chroma intra prediction, the intra prediction of the luminance signal and the intra prediction of the chrominance signal are difficult to be processed in parallel, and thus higher performance of the process cannot be achieved.

Figure 8B:
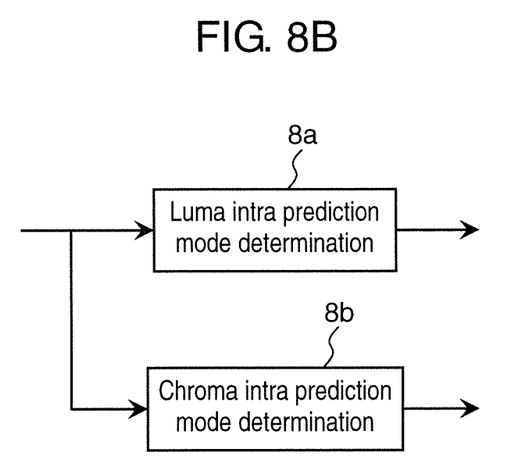
FIG. 8B is a diagram for illustrating parallel processing of the intra prediction process according to the exemplary embodiment.

On the contrary, in the intra prediction processes shown in FIG. 3, candidate intra prediction modes that are selectable for the intra prediction of the chrominance signal are predetermined as shown in FIG. 6, and thus the intra prediction of the luminance signal and the intra prediction of the chrominance signal can be performed in parallel as shown in FIG. 8B. Note that luma intra prediction mode determination 8a in FIG. 8B corresponds to the luma intra prediction of loop 1 and step S115 of FIG. 3, and chroma intra prediction mode determination 8b corresponds to the chroma intra prediction of loop 2 and step S215 of FIG. 3. The example shown in FIG. 8B performs luma intra prediction mode determination 8a and chroma intra prediction mode determination 8b in parallel.

Note that a chrominance signal includes Cb and Cr components. The chroma intra prediction may select an intra prediction mode for the Cb component by performing loop 2 and step S215 of FIG. 3, and may select the same intra prediction mode as that of the Cb component for the Cr component.

As described above, image coding apparatus 100 according to this exemplary embodiment uses the intra prediction processes of FIG. 3, to thereby impose a selective limitation on the set of candidate prediction modes defined in the HEVC standard with respect to the candidate prediction modes (second set of candidates) for the intra prediction of the chrominance signal, and thus parallel processing is achieved. Accordingly, image coding apparatus 100 can rapidly generate code strings compliant to the HEVC standard, and provide high performance intra prediction processes.

[Variations]

Although this exemplary embodiment has been described using an example of coding an image having a first signal being the luminance signal and a second signal being the chrominance signal, the present disclosure is not limited thereto. For example, coding may be performed such that the chrominance signal is separated into Cb and Cr components, and the luminance signal, the chrominance Cb signal, and the chrominance Cr signal may be processed in parallel. Alternatively, if the signal components contained in an image is RGB components, the R, G, and B signals may be processed in parallel, for example.

Moreover, although this exemplary embodiment has been described using an example in which, in step S112, the prediction modes to be evaluated are limited to modes 0, 26, 10, and 1, and the other prediction modes are excluded from the set of candidate prediction modes as shown in FIG. 6, the present disclosure is not limited thereto. For example, coding may be performed such that, as shown in FIG. 7, if the luma intra prediction has selected a prediction mode other than modes 0, 26, 10, and 1, the prediction modes to be evaluated are limited to modes 0, 26, 10, and 1, while if the luma intra prediction has selected one of the modes 0, 26, 10, and 1, the prediction modes to be evaluated are not limited, but the prediction mode is selected from all the candidate prediction modes selectable defined in the HEVC standard, i.e., from modes 34, 0, 26, 10, and 1.

Furthermore, this exemplary embodiment has been described as evaluating all the 35 selectable prediction modes with respect to the luminance signal, the present disclosure is not limited thereto. For example, forbidding selection of modes 2 to 9 for both the intra prediction of the luminance signal and the intra prediction of the chrominance signal eliminates the need to retain left lower pixel values during generation of a residual signal, and thus achieves a coding process that permits improved design freedom of hardware.

In the example shown in FIG. 8B, the processes of the luma intra prediction and the chroma intra prediction may be simultaneously started, or the process of the chroma intra prediction may be started before the process of the luma intra prediction. That is, in the process sequence described above, a part of the process sequence of the intra prediction may be reordered as long as parallel processing can be provided.

Note that the calculation of evaluation values for the respective intra prediction modes in steps S112 and S212 of FIG. 3 may be performed in parallel. For example, intra prediction unit 108 may include a plurality of (2 to 40) arithmetic units (e.g., arithmetic circuits implemented by hardware) for each calculating the evaluation value of one intra prediction mode, and assign a part or all of the iteration processes of loop 1 and loop 2 to the plurality of arithmetic units. This permits the calculation of evaluation values for the respective intra prediction modes to be parallelized.

This parallelization of a part or all of the iteration processes of loop 1 and loop 2 may be implemented by software instead of the arithmetic circuits. For example, the iteration processes described above may be assigned to tasks of multitask processing, or may be assigned to threads in a multithreaded environment, in the processor included in intra prediction unit 108. This permits the calculation of evaluation values for the respective intra prediction modes to be substantially parallelized.

In addition, although the foregoing description discusses an example of using the HEVC standard, the present disclosure is applicable to any image coding standard that performs, on an image having a plurality of signals, an intra prediction process for each of the signals.

Although the foregoing description assumes, for purposes of illustration, a configuration in which image coding apparatus 100 only includes intra prediction unit 108 as the prediction unit, image coding apparatus 100 may include a function block that performs inter prediction.

Although FIG. 1 illustrates a simple case in which only intra prediction is used as the prediction process, a similar process to that described above is also applicable to an intra-picture in an input video frame containing an inter-picture, or to a case in which at least one target intra CU to be processed is contained in an inter-picture.

As described above, the exemplary embodiment has been described as an illustrative example of the technique of the present disclosure. To this end, the accompanying drawings and the detailed description are provided.

Accordingly, the components illustrated in the accompanying drawings and the detailed description may include not only the components essential for solving a problem, but also components that are not essential for solving a problem in order to illustrate the technique. Thus, these nonessential components should not be deemed as essential directly from the fact that these nonessential components appear in the accompanying drawings and/or in the detailed description.

Moreover, since the exemplary embodiment described above is intended to illustrate the technique of the present disclosure, various modifications, substitutions, addition, and omission can be made within the scope of the claims or within the range of equivalency of the claims.

An image coding method according to the present disclosure is an image coding method for obtaining a picture in a video sequence, the picture containing a first signal that represents luminance or color and a second signal that represents chrominance or color, and coding the obtained picture. The image coding method includes partitioning the obtained picture, to generate at least one processing block as a processing unit for intra prediction (step S103 of FIG. 2), performing, on each of the at least one processing block, first intra prediction (steps S111 to S115 of FIG. 3) that selects one intra prediction mode from a first set of candidates (FIG. 4) including a plurality of intra prediction modes, based on a component of the first signal contained in the processing block, performing, on each of the at least one processing block, second intra prediction (steps S211 to S215 of FIG. 3) that selects one intra prediction mode from a second set of candidates (small tables 6b/7b) that is a subset of the plurality of intra prediction modes, based on a component of the second signal contained in the processing block, and performing a first coding process that predictively codes the component of the first signal contained in each of the at least one processing block by using the intra prediction mode selected in the first intra prediction, and performing a second coding process that predictively codes the component of the second signal contained in each of the at least one processing block by using the intra prediction mode selected in the second intra prediction (steps S117 and S118 of FIG. 3). The second set of candidates (small tables 6b/7b) is a subset including the intra prediction modes other than the intra prediction modes having dependency between the second intra prediction and the first intra prediction, and the first intra prediction and the second intra prediction are performed in parallel (FIGS. 3 and 8B).

This permits the first intra prediction and the second intra prediction to be performed in parallel, and thus higher performance to be achieved in intra prediction.

For example, the first signal may represent luminance, and the second signal may represent chrominance.

This permits the luma intra prediction and the chroma intra prediction to be performed in parallel, and thus higher process performance to be achieved.

For example, the first set of candidates may include 35 intra prediction modes from mode 0 to mode 34 defined in the HEVC standard; the intra prediction modes that have dependency may be modes 2 to 9, modes 11 to 25, and modes 27 to 34 defined in the HEVC standard; and the second set of candidates (see small table 6b) may be a subset including modes 0, 1, 10, and 26 defined in the HEVC standard.

This permits such image coding method to provide high-speed processing of code strings compliant to the HEVC standard.

For example, the first set of candidates may include 35 intra prediction modes from mode 0 to mode 34 defined in the HEVC standard; the intra prediction modes that have dependency may be modes 2 to 9, modes 11 to 25, and modes 27 to 33 defined in the HEVC standard; and the second set of candidates (see small table 7b) may be a subset including modes 0, 1, 10, 26, and 34 defined in the HEVC standard.

This permits such image coding method to provide high-speed processing of code strings compliant to the HEVC standard.

An image coding apparatus according to the present disclosure is an image coding apparatus for obtaining a picture in a video sequence, the picture containing a first signal that represents luminance or color and a second signal that represents chrominance or color, and coding the obtained picture. The image coding apparatus includes a partitioner that partitions the obtained picture, to generate at least one processing block as a processing unit for intra prediction, and an intra prediction unit that performs, on each of the at least one processing block, first intra prediction that selects one intra prediction mode from a first set of candidates including a plurality of intra prediction modes based on a component of the first signal contained in the processing block, and performs, on each of the at least one processing block, second intra prediction that selects one intra prediction mode from a second set of candidates that is a subset of the plurality of intra prediction modes, based on a component of the second signal contained in the processing block. The intra prediction unit performs a first coding process that predictively codes the component of the first signal contained in each of the at least one processing block by using the intra prediction mode selected in the first intra prediction, and performs a second coding process that predictively codes the component of the second signal contained in each of the at least one processing block by using the intra prediction mode selected in the second intra prediction. The second set of candidates is a subset including the intra prediction modes other than the intra prediction modes having dependency between the second intra prediction and the first intra prediction, and the first intra prediction and the second intra prediction are performed in parallel.

This permits the first intra prediction and the second intra prediction to be performed in parallel, and thus higher performance to be achieved in intra prediction.

Note that these general or specific aspects may be implemented by an apparatus, a system, a method, an integrated circuit, a computer program, or a computer-readable storage medium such as a CD-ROM, or may be implemented by any combination of a system, a method, an integrated circuit, a computer program, and a storage medium.

In the exemplary embodiment described above, each component may be implemented using dedicated hardware, or may be implemented by executing a software program suitable for each component. Each component may be implemented in such a manner that a program execution unit, such as a CPU or a processor, reads and executes a software program stored in a storage medium, such as a hard disc or a semiconductor memory.

Note that all the numbers as used above are intended to specifically illustrate the present disclosure, and are not intended to limit the present disclosure.

The order of performing the plurality of steps shown in each of the flowcharts mentioned above is intended to specifically illustrate the present disclosure, and these steps may be performed in a different order. In addition, a part of these steps may be performed simultaneously (i.e., in parallel) with at least one other step.

The present disclosure is applicable to an image coding method and to an image coding apparatus. More specifically, the present disclosure is applicable to a recorder, a digital camera, and a tablet terminal device.

What is claimed is:

1. An image coding method comprising:
obtaining a picture in a video sequence, the picture containing a first signal and a second signal;
partitioning the obtained picture, to generate at least one processing block as a processing unit for intra prediction;
performing, on each of the at least one processing block, a first intra prediction that selects one intra prediction mode from a first set of candidates based on a component of the first signal contained in the processing block;
performing, on each of the at least one processing block, a second intra prediction that selects one intra prediction mode from a second set of candidates based on a component of the second signal contained in the processing block; and
performing a first coding process that predictively codes the component of the first signal contained in each of the at least one processing block by using the intra prediction mode selected in the first intra prediction, and performing a second coding process that predictively codes the component of the second signal contained in each of the at least one processing block by using the intra prediction mode selected in the second intra prediction, wherein:
the first set of candidates includes a plurality of intra prediction modes, and the second set of candidates includes at least one intra prediction mode, having no dependency between the second intra prediction and the first intra prediction, of the plurality of intra prediction modes,
the first intra prediction and the second intra prediction are performed in parallel,
the first set of candidates includes 35 intra prediction modes from mode 0 to mode 34 defined in a High Efficiency Video Coding (HEVC) standard,
intra prediction modes having the dependency are mode 2 to mode 9, mode 11 to mode 25, and mode 27 to mode 34 defined in the HEVC standard, and
the second set of candidates is a subset including mode 0, mode 1, mode 10, and mode 26 defined in the HEVC standard.

2. An image coding method comprising:
obtaining a picture in a video sequence, the picture containing a first signal and a second signal;
partitioning the obtained picture, to generate at least one processing block as a processing unit for intra prediction;
performing, on each of the at least one processing block, a first intra prediction that selects one intra prediction mode from a first set of candidates based on a component of the first signal contained in the processing block;
performing, on each of the at least one processing block, a second intra prediction that selects one intra prediction mode from a second set of candidates based on a component of the second signal contained in the processing block; and
performing a first coding process that predictively codes the component of the first signal contained in each of the at least one processing block by using the intra prediction mode selected in the first intra prediction, and performing a second coding process that predictively codes the component of the second signal contained in each of the at least one processing block by using the intra prediction mode selected in the second intra prediction, wherein:
the first set of candidates includes a plurality of intra prediction modes, and the second set of candidates includes at least one intra prediction mode, having no dependency between the second intra prediction and the first intra prediction, of the plurality of intra prediction modes,
the first intra prediction and the second intra prediction are performed in parallel,
the first set of candidates includes 35 intra prediction modes from mode 0 to mode 34 defined in a High Efficiency Video Coding (HEVC) standard,
intra prediction modes having the dependency are mode 2 to mode 9, mode 11 to mode 25, and mode 27 to mode 33 defined in the HEVC standard, and
the second set of candidates is a subset including mode 0, mode 1, mode 10, mode 26, and mode 34 defined in the HEVC standard.

3. An image coding method comprising:
obtaining a picture in a video sequence, the picture containing a first signal and a second signal;
partitioning the obtained picture, to generate at least one processing block as a processing unit for intra prediction;
performing, on each of the at least one processing block, a first intra prediction that selects one intra prediction mode from a first set of candidates based on a component of the first signal contained in the processing block;
performing, on each of the at least one processing block, a second intra prediction that selects one intra prediction mode from a second set of candidates based on a component of the second signal contained in the processing block; and
performing a first coding process that predictively codes the component of the first signal contained in each of the at least one processing block by using the intra prediction mode selected in the first intra prediction, and performing a second coding process that predictively codes the component of the second signal contained in each of the at least one processing block by using the intra prediction mode selected in the second intra prediction, wherein:
the first set of candidates includes a plurality of intra prediction modes, and the second set of candidates includes at least one intra prediction mode, having no dependency between the second intra prediction and the first intra prediction, of the plurality of intra prediction modes,
the first intra prediction and the second intra prediction are performed in parallel,
the first set of candidates includes 35 intra prediction modes from mode 0 to mode 34 defined in a High Efficiency Video Coding (HEVC) standard, and
one of the following conditions is satisfied:
(i) intra prediction modes having the dependency are mode 2 to mode 9, mode 11 to mode 25, and mode 27 to mode 34 defined in the HEVC standard, and the second set of candidates is a subset including mode 0, mode 1, mode 10, and mode 26 defined in the HEVC standard, or
(ii) intra prediction modes having the dependency are mode 2 to mode 9, mode 11 to mode 25, and mode 27 to mode 33 defined in the HEVC standard, and the second set of candidates is a subset including mode 0, mode 1, mode 10, mode 26, and mode 34 defined in the HEVC standard.

4. The image coding method according to claim 3, wherein the first signal represents luminance, and the second signal represents chrominance.

5. The image coding method according to claim 3, wherein the first signal represents a color, and the second signal represents a color different from the color represented by the first signal.

6. The image coding method according to claim 3, wherein the at least one intra prediction mode that has no dependency between the second intra prediction and the first intra prediction is an intra prediction mode selectable without using a result of the first intra prediction.

* * * * *